May 27, 1952     E. W. SCHWANKE     2,598,021

FISHING POLE HOLDER

Filed Aug. 10, 1949

INVENTOR.
Edward W. Schwanke
BY
Charles & French
Att'ys.

Patented May 27, 1952

2,598,021

UNITED STATES PATENT OFFICE 2,598,021

FISHING POLE HOLDER

Edward W. Schwanke, Sheboygan, Wis.

Application August 10, 1949, Serial No. 109,472

3 Claims. (Cl. 224—5)

The invention relates to fishing apparatus for one armed fishermen.

The general object of the invention is to provide an apparatus whereby a one arm fisherman may use a casting rod to cast out his lure and readily retrieve the lure.

A further object of the invention is to provide a body supported holder for a fishing rod whereby after a one arm fisherman has made his cast he may readily position the rod in the holder so that he may operate the reel with his one hand to retrieve the lure or bait. More particularly, the holder includes releasable means for holding the handle of the rod to the body of the wearer.

The invention further consists in the several features hereinafter set forth and more particularly defined by claims at the conclusion hereof.

Figure 1:
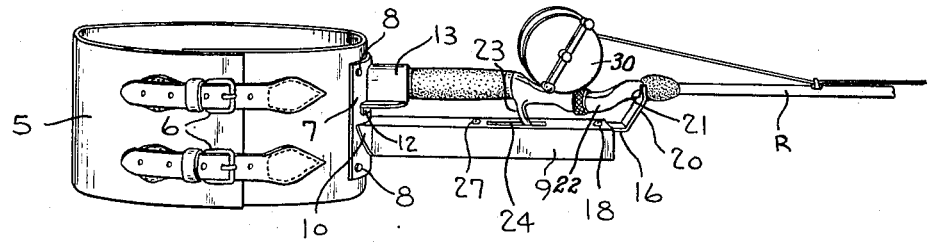
Fig. 1 is a perspective view of apparatus embodying the invention, parts of the rod being broken away.
Figure 2:
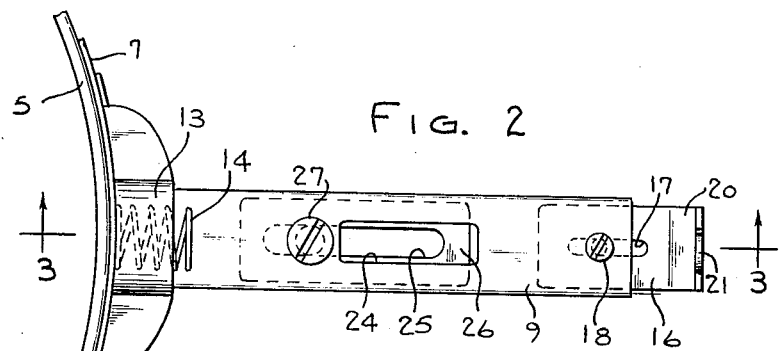
Fig. 2 is a plan view of the rod holder, parts being broken away.
Figure 3:
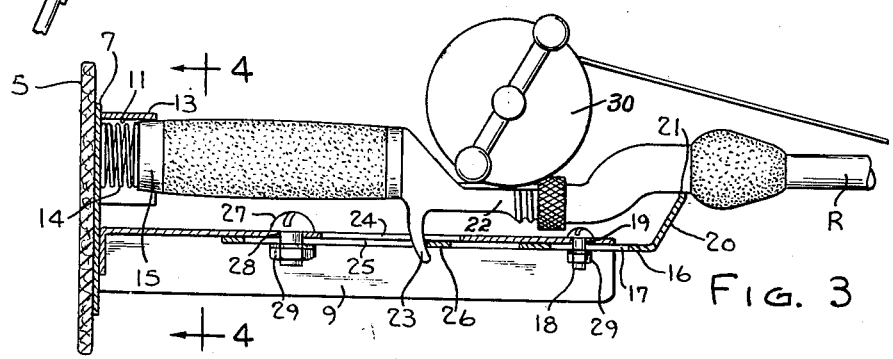
Fig. 3 is a detailed vertical sectional view taken on the line 3—3 of Fig. 2.
Figure 4:
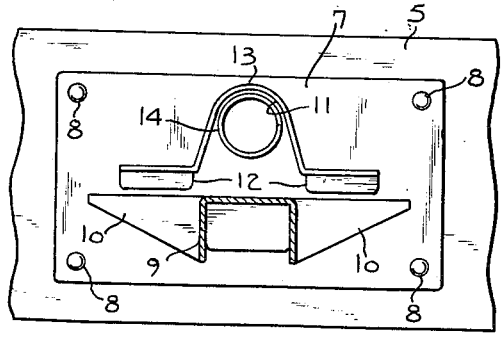
Fig. 4 is a detailed vertical sectional view taken on the line 4—4 of Fig. 3.

Referring to the drawings, the numeral 5 designates a wide belt of leather or other suitable material provided with buckles 6. A metal base plate 7 is secured to a portion of the front face of the belt by rivets 8 or other suitable fastening means.

A strut or arm 9 formed of sheet metal of channel form is provided with base flanges 10 welded or otherwise suitably anchored to the plate 7.

A rod handle end receiving socket or pocket 11 is formed by a piece of sheet metal having base flanges 12 welded or otherwise suitably anchored to the base plate 7 and having an arched or socket portion 13 which preferably tapers outwardly toward said base flanges.

A coiled spring 14 is secured at one end to the plate 7 and is disposed within the socket for abutting contact with the butt end 15 of the handle of the rod.

The arm 9 is adapted to engage portions of the rod handles of the usual types of casting rods. For this purpose a bracket member 16 has a slotted portion 17 through which a clamping bolt 18 extending through an opening 19 in the outer end of the arm passes by which the member 16 may be secured in different positions lengthwise relative to the arm, said member 16 having an upstanding arm 20 which has a forked upper end 21 to engage the handle of the rod adjacent the front end of the reel seat 22 when the end 15 of said handle is inserted in the socket portion 13 against the pressure of the spring 14 to prevent lateral movement of the rod and provide an outboard support for the rod. When so positioned, the index finger grip 23 of the handle is adapted to extend down through a slot 24 in the arm into a slot 25 in a plate 26 lengthwise adjustably secured to the arm 9 by a clamping bolt 27 extending through an opening 28 in the arm and through the slot 25. The clamping nuts 29 for the bolts 18 and 27 may be wrench-tightened nuts or hand-tightened wing nuts. The engagement of the finger grip 23 in the slot 25 holds the rod handle against turning relative to the arm 9 and also against lengthwise movement relative to said arm. The front end of the slot 25 by the adjustment of the plate 26 may also vary the amount of compression of the spring 14. The parts above described form a body supported holder for the handle of the fishing rod R which has the usual reel 30 mounted on the reel seat 22.

With the above described construction the fisherman grasps the rod handle and makes his cast in the usual manner, and as he completes his cast, he bring the handle of the rod down to a position where he can insert the butt end 15 of said handle into the socket 13 and press inwardly with the butt against the spring 14 while bringing the front end of the handle down into the crotch or fork 21 of the arm 20 and the grip 23 into the slot 25. The rod is then held to his body by the holder, and he may now use his one hand to manipulate the reel 30 to reel in or retrieve his lure. If while the rod is held to the holder, he wishes to elevate or depress the tip of the rod R, he may do this by swinging his body about the hips. After completing the cast or the retrieving of the lure, he again grasps the handle of the rod and tilts the front end upwardly slightly while pressing inwardly with the butt against the spring 14 to release the handle of the rod from the holder. The spring 14 permits him to quickly and easily snap the rod into and out of reeling position on the holder with one hand.

I desire it to be understood that this invention is not to be limited to any particular form or arrangement of parts except in so far as such limitations are included in the claims.

What I claim as my invention is:

1. Apparatus for enabling a one arm fisherman to cast with a casting rod having a handle provided with a reel seat and a forwardly facing finger grip comprising a mounting support, a rod support mounted on said mounting support having an upstanding notched arm to engage the rod handle in front of the reel seat, a compression spring mounted on said mounting support above said rod support and engageable with the butt end of the handle, said rod support having an adjustable rearwardly facing stop portion engageable with the forwardly facing finger grip of the handle to hold the same, against the compression pressure of said spring, against lengthwise movement relative to said handle.

2. Apparatus for enabling a one armed fisherman to cast with a casting rod comprising a body supported holder having parts engageable with the front and back portions of the handle of the rod including a spring acting forwardly on the butt end of the handle and in end thrust engagement therewith, and a rearwardly facing stop on the holder engageable with a forwardly facing part of said handle to releasably hold the handle in the holder.

3. Apparatus for enabling a one armed fisherman to cast with a casting rod comprising a belt encircling the waist of the fisherman, a rod support mounted on the belt having an upstanding notched arm to engage the rod handle adjacent the front of the reel seat of the handle and a rearwardly facing stop portion, a compression spring means in end thrust engagement with the butt end of the handle to urge a forwardly facing part of the same against said rearwardly facing stop portion, and a socket open at its lower end and surrounding a portion of said spring means and preventing upward tilt and lateral movement of the butt end of said handle and serving as a guide for the movement of said handle in compressing said spring means.

EDWARD W. SCHWANKE.

REFERENCES CITED

The following references are of record in the file of this patent:

UNITED STATES PATENTS

| Number | Name | Date |
| --- | --- | --- |
| 620,616 | Shoemaker | Mar. 7, 1899 |
| 1,174,319 | Hipwood | Mar. 1, 1916 |
| 1,985,985 | Gerline | Jan. 1, 1935 |
| 2,099,254 | Ballman | Nov. 16, 1937 |
| 2,236,070 | Rohrdanz | Mar. 25, 1941 |
| 2,341,432 | Rishel | Feb. 8, 1944 |
| 2,454,458 | Kaetker | Nov. 23, 1948 |
| 2,537,456 | Goss | Jan. 9, 1951 |